INVENTOR.
WILLIAM S. BENES

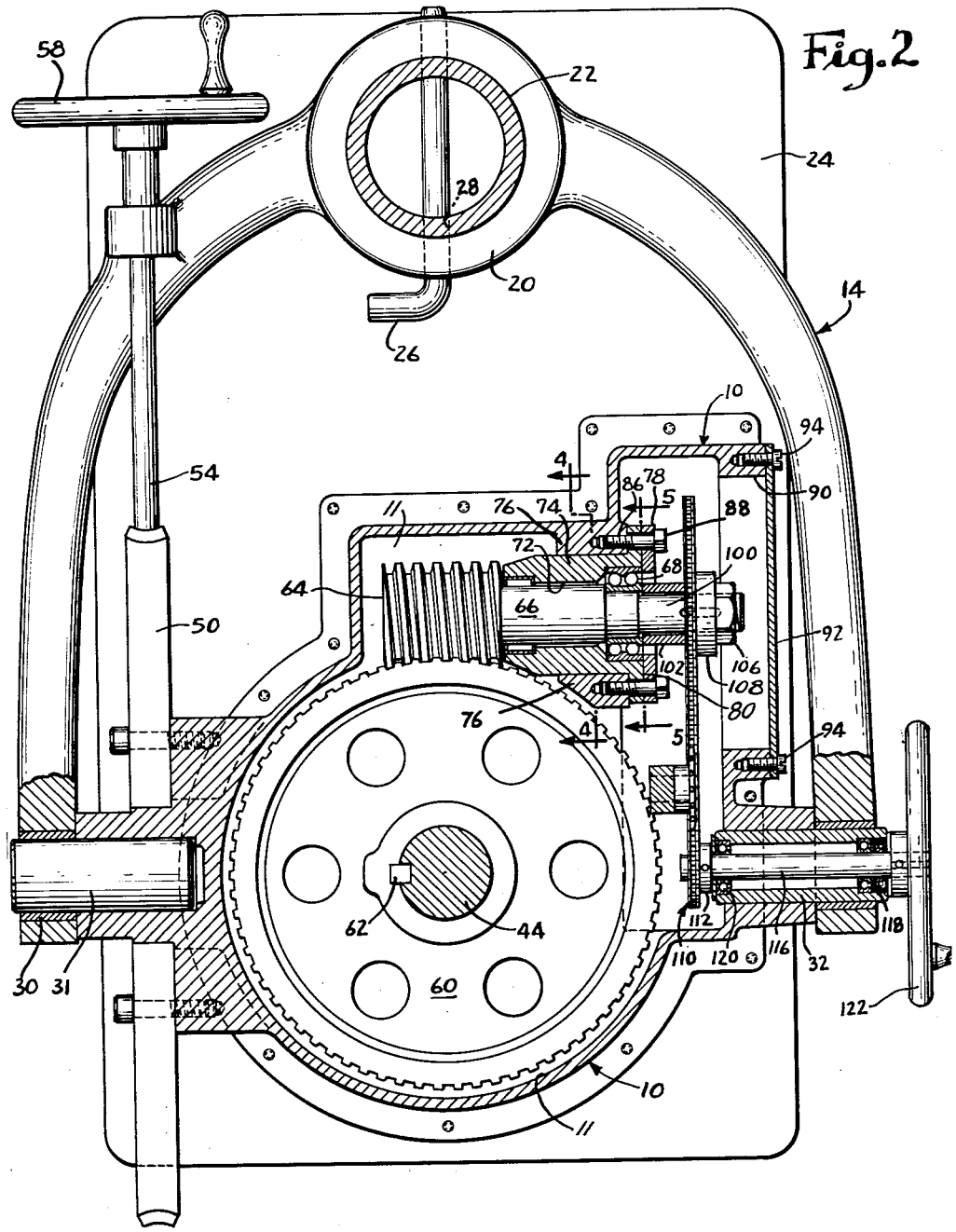

Feb. 20, 1962 W. S. BENES 3,022,066
DRIVING MECHANISM FOR WORK-POSITIONING TABLES
Filed June 25, 1958 4 Sheets-Sheet 3
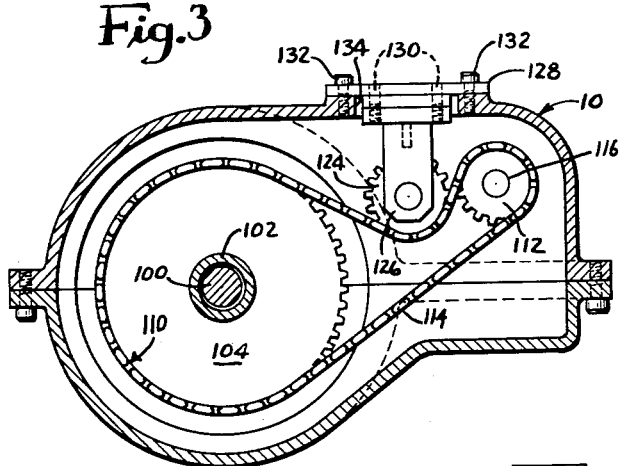
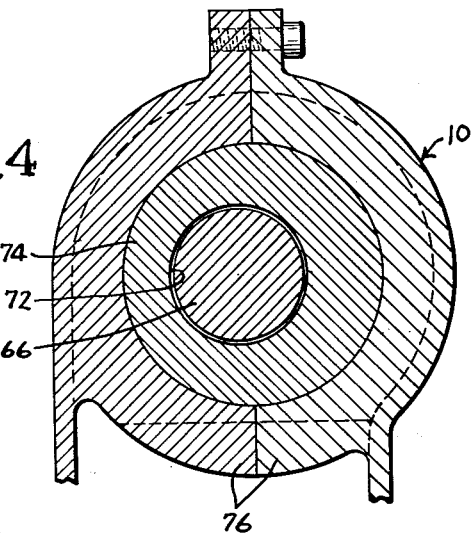
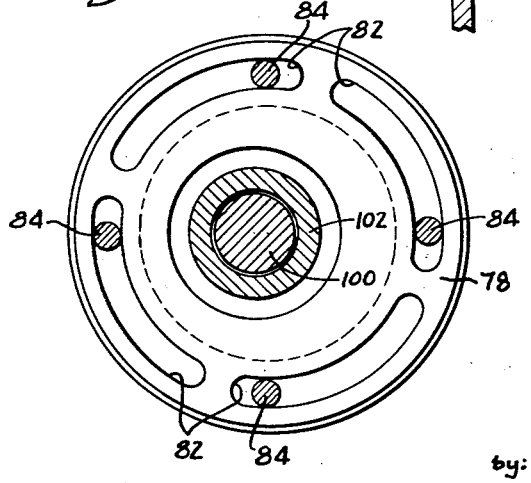
INVENTOR
WILLIAM S. BENES
by: *Norman Gerlach*
ATTY.

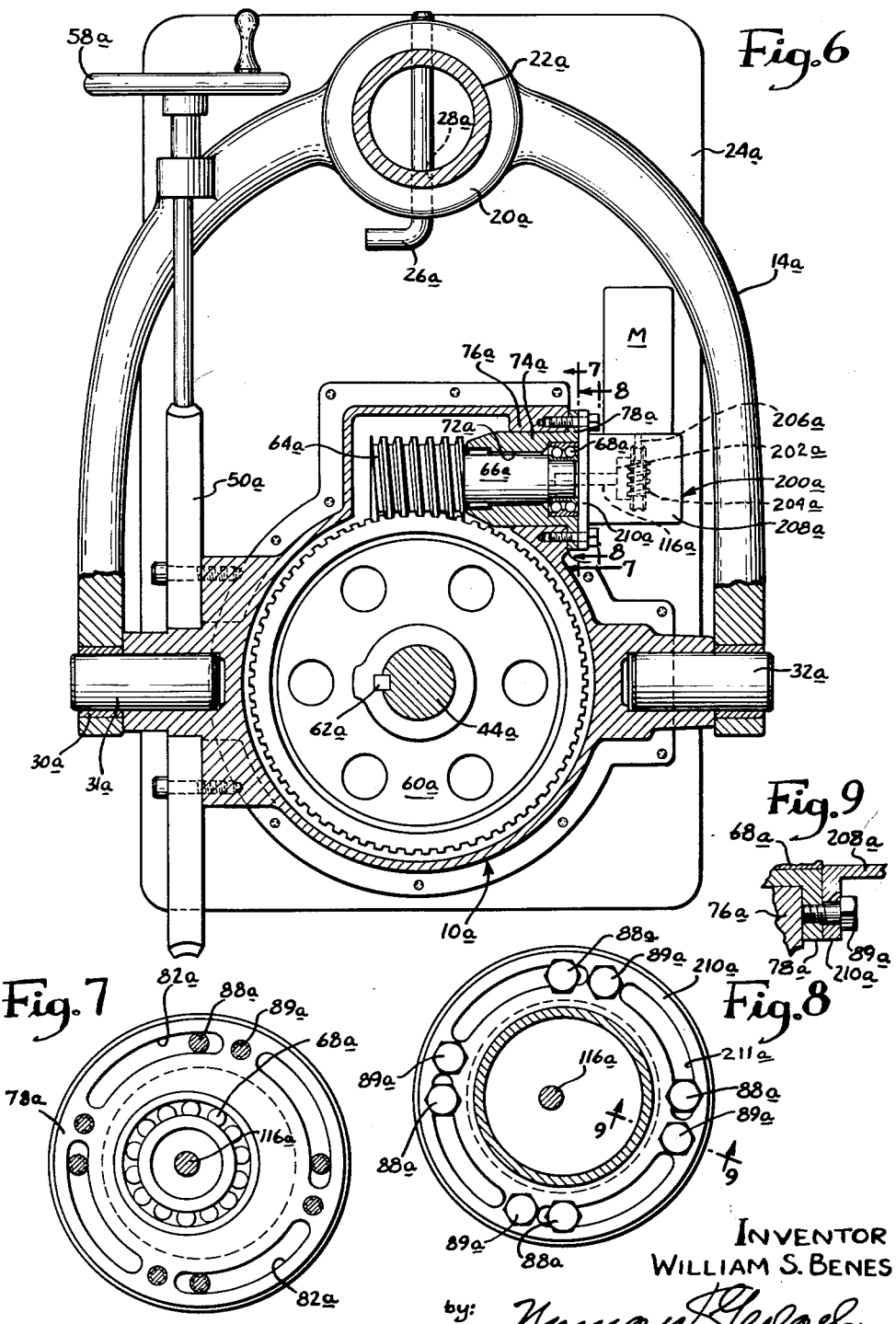

ated Feb. 20, 1962

3,022,066
DRIVING MECHANISM FOR WORK-POSITIONING TABLES
William S. Benes, Riverside, Ill., assignor to Cullen-Friestedt Company, Chicago, Ill., a corporation of Illinois
Filed June 25, 1958, Ser. No. 744,481
2 Claims. (Cl. 269—61)

The present invention relates to work positioners of the type which are designated primarily to hold structural metallic workpieces in different positions in connection with automatic welding or metal spraying operations to be performed upon the workpieces. The invention is specifically concerned with a novel form of driving mechanism for effecting rotational movement of the work-positioning table associated with such a work positioner.

Teh invention is particularly well adaptable for use in connection with work-positioners of the type shown and described in the patent to Mueller, No. 2,318,791, granted on May 11, 1943 and entitled "Work Positioner." Briefly, work positioners of this character involve in their general organization a base support from which there projects a fixed standard on which there is supported a casting assembly which carries the work-supporting table and which has associated therewith suitable driving mechanism by means of which rotational movement may be imparted to the work-supporting table. The casting assembly is itself capable of swinging movement about a horizontal axis so that the table associated therewith may be caused to assume different inclinations as between a vertical position, a horizontal position, or in-between positions. At any given inclination or position of the work table, rotational movement may be imparted to the table so that the same may turn in its own plane.

In utilizing work positioners of this character for certain operations, as, for example, automatic welding or metal spraying operations, it is essential that the motion of the workpiece be controlled with a high degree of accuracy. Irregular or jerking motions of the workpiece will frequently result in localized overheating of the workpiece, in the case of welding operations where the welding electrode is maintained in register with one region of the work for too long a period of time, or it may result in irregular deposition of metal on the workpiece where spraying operations are concerned. Such irregular movement of the workpiece is particularly prevalent when the plane of the work table is vertical or at a steep incline relative to a vertical plane and when the workpiece is positioned on the work-supporting table where its center of mass is offset from the center of rotation of the work-supporting table. When a given workpiece is thus eccentrically mounted on the work-supporting table, the same moves counter to the force of gravity during one-half of a table revolution and it moves in the direction of the force of gravity during the other half of the table revolution. At the transition point where the workpiece is moving over a dead center, so to speak, a reversal in the direction of the gravitational torque imposed upon the driving mechanism takes place and any lost motion existing in the driving mechanism, as, for example, by a ciearance between various gear teeth, chain slack, or other looseness between the parts, will cause a back lash to take place. Such back lash is in the nature of an irregular or jerky movement of the work-supporting table and frequently results in the production of an inferior or defective workpiece.

Limitations of the character briefly outlined above are prevalent in connection with conventional work positioners and the present invention is designed to overcome these limitations by providing a driving mechanism for work-positioning tables, utilizing a self-locking worm and worm gear arrangement at the extreme driven end of the power train leading from the driving shaft to the driven shaft of the work table with the worm gear being fixedly attached to the table so that it constitutes the final driven member of the power train, together with novel means whereby, in the event that the various parts involved become loose due to wear or for any other reason, an adjustment may be made within very fine limits to eliminate the possibility of any back lash taking place.

The provision of a driving mechanism for work-positioning tables of the character briefly outlined above among the principal objects of the invention, a further object is to provide such a mechanism wherein the adjustment may be effected by a simple manual operation and wherein a relatively large angular displacement of the adjusting member will result in an extremely small linear displacement in the member which is to be adjusted so that the adjustment may be manually effected with comparative ease and within very fine limits.

The provision of a driving mechanism for work-positioning tables which is relatively simple in its construction and which may, therefore, be manufactured at a low cost; one which is comprised of a minimum number of parts, particularly moving parts, and which, therefore, is unlikely to get out of order; one which is rugged and durable and which, therefore, will withstand rough usage; one which is smooth and silent in its operation; and one which otherwise is well adapted to perform the services required of it, are further desirable features which have been borne in mind in the production and development of the present invention.

With these and other objects in view, which will become more readily apparent as the nature of the invention is better understood, the same consists in the novel construction, combination, and arrangement of parts shown in the accompanying four sheets of drawings forming a part of this specification.

In these drawings:

FIG. 2 is a sectional view taken substantially along the line 2—2 of FIG. 1 in the direction indicated by the arrows;

FIG. 3 is a sectional view taken substantially along the line 3—3 of FIG. 1;

FIG. 4 is a sectional view taken substantially along the line 4—4 of FIG. 2;

FIG. 5 is a sectional view taken substantially along the line 5—5 of FIG. 2;

FIG. 6 is a sectional view similar to FIG. 2 taken along the axis of tilting movement of a modified form of center casting embodying the principles of the present invention;

FIG. 7 is a sectional view taken substantially along the line 7—7 of FIG. 6;

FIG. 8 is a sectional view taken substantially along the line 8—8 of FIG. 6; and FIG. 9 is a sectional view taken substantially along the line 9—9 of FIG. 8.

Figure 1:
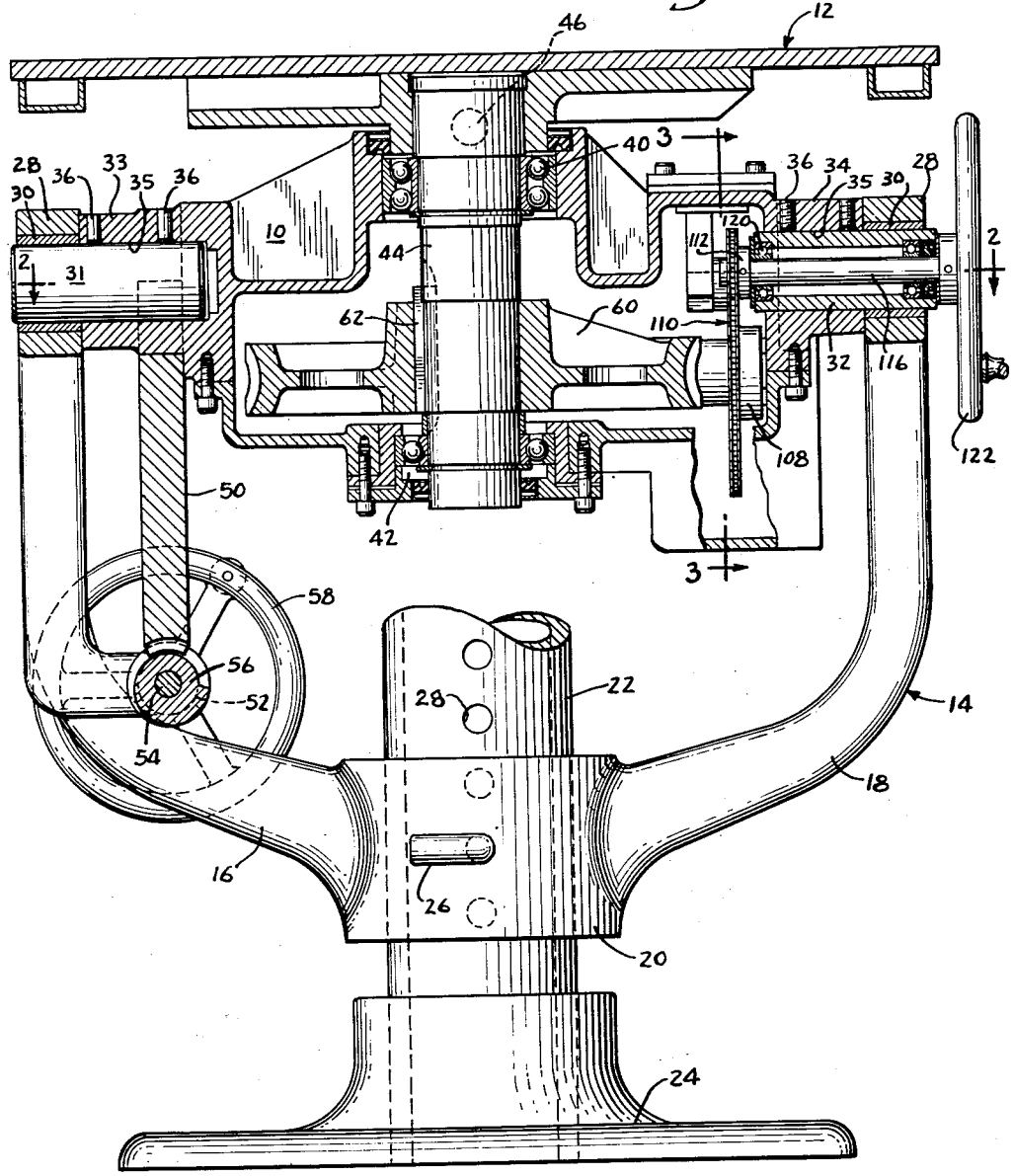
FIG. 1 is a sectional taken substantially centrally and vertically through the pivotally supported center casting assembly of a work positioner constructed in accordance with the principles of the present invention.

Referring now to the drawings in detail and in particular to FIGS. 1 and 2 wherein one embodiment of the invention has been illustrated, a center casting assembly has been designated in its entirety at 10. The casting 10 provides a housing or casing of hollow design and having a central chamber therein as indicated at 11 in FIG. 3, and within which chamber most of the operative moving parts of the work positioner are enclosed. The casting assembly forms a composite part of a work positioner of the type shown and described in the above-mentioned patent to Mueller, and it is shown with the work-supporting table 12 thereof in a horizontal position, i.e., parallel to the floor or other supporting surface. The casting 10 is tiltably mounted for horizontal swinging movement in a yoke casting 14 having upwardly and outwardly diverging yoke arms 16 and 18, respectively, which are joined at their lower proximate ends to a tubular supporting sleeve 20 which is vertically adjustable on a cylindrical post 22 projecting upwardly from a base member 24 adapted to rest upon and be bolted or otherwise fixedly secured to a supporting surface, such as a floor or the like. The sleeve 20 is adapted to be pinned in any desired position of vertical adjustment on the post 22 by means of a series of holes 23 which are provided in the post 22 for selective reception of a pin 26. The outer or distal ends of the arms 16 and 18 are formed with trunnion supports or bearings 28 carrying bushings 30 in which there are rotatably mounted a pair of trunnions 31 and 32 carried by the casting 10 on opposite sides thereof and by means of which trunnions the casting 10 is tiltably supported on the yoke casting 14. The trunnion 31 is solid while the trunnion 32 is of tubular sleeve-like design for a purpose that will appear presently.

The casting 10 is of irregular hollow shape and it is provided at the sides thereof with a pair of hub portions 33 and 34, respectively, each having trunnion-receiving bores 35 therein, into which bores the trunnions 32 extend and in which they are secured by means of set screws 36.

The casting 10 is roughly circular in horizontal cross section, considering the same to be positioned with the plane of the work-supporting table 12 extending horizontally as illustrated herein. At least, in horizontal cross section, approximately 270° thereof is circular as seen in FIG. 2. Therefore, with reference to its cylindrical cross section, the casting may be said to have a longitudinal axis, and the direction of extent of the trunnions 32 may be said to be radial. Extending longitudinally and axially of the casting 10 and rotatably journalled in anti-friction bearings 40 and 42 carried by the casting 10 is a central table-supporting driven shaft 44, the upper end of which, as viewed in FIG. 1, has centrally mounted thereon the work-positioning table 12. The table 12 may be permanently and fixedly mounted on the end of the shaft 44 in any suitable manner as, for example, by a cross pin 46. The work-positioning table is thus rotatable bodily with the shaft 44 in its own plane, and the plane of the table may be adjusted angularly by tilting the entire casting assembly 10 in a fore and aft direction about the common axis of the trunnions 32.

In order to effect fore and aft tilting movement of the casting 10 about the common axis of the trunnions 32, a gear sector 50 is provided on the casting 10 in the vicinity of the hub 33. This gear sector 50 depends from the hub 33 and meshes with a worm 52 provided on a worm shaft 54 rotatably mounted in a bearing 56 suitably supported on the yoke arm 16. The shaft 54 carries a hand wheel 58 by means of which torque may be applied to the shaft to rotate the same and thus establish a drive to the worm 52 and gear sector 50 to effect tilting movement of the casting 10.

The arrangement of parts thus far described is more or less conventional in its nature and no claim is made herein to any novelty associated with the same, the novelty of the present invention residing rather in the driving mechanism for effecting rotational movements of the work table 12 in its own plane and whereby a self-locking power train which is completely devoid of any lost motion may be effected.

The table supporting shaft 44 extends substantially centrally and longitudinally through the housing 10 and carries thereon medially of its ends a relatively large worm gear or wheel 60, the latter being keyed as at 62 to the shaft 44. The gear 60 meshes with a worm 64 (FIG. 2) carried on a worm shaft 66 rotatably mounted in bearings 68 supported in an offset or eccentrically disposed bore 72 formed in a rotatable sleeve member 74 which is itself rotatably mounted in a generally circular boss or web 76 formed internally on the casting 10. The sleeve member 74 is formed with an upper radially extending annular flange 78 which overlies and is adapted to seat upon the upper annular surface 80 of the web 76. As best seen in FIG. 5, the annular flange 78 is formed with a series of four arcuate, circumferentially spaced, slots 82 therethrough, and through which slots there are adapted to extend respective clamping bolts 84, the shank portions 86 of which are threadedly received in the boss 76 and the head portions 88 of which overlie the edges of the slot 82 and are adapted, upon tightening of the bolts 78, to clamp the sleeve 74 in any desired position of circumferential adjustment. One side wall of the casting 10 is formed with an access opening 90 therein adapted to be closed by means of a cover plate 92 which extends across the opening and which is adapted to be maintained in position by suitable clamping screws 94 or the like.

The worm shaft 66 is provided with a reduced end 100 (see also FIG. 3) over which there is received a spacer sleeve 102 which bears at one end against the bearing 68 and at the other end against a sprocket wheel 104. A clamping nut 106 and cooperating washer 108 are received on the reduced end portion 100 of the shaft 66 and serve to normally clamp the sprocket wheel 104 and spaced member 102 in fixed position on the extension 100 of the shaft 66.

The sprocket wheel 104 constitutes the driven element of a chain and sprocket assembly 110 including a driving sprocket wheel 112 and a chain 114 which passes over both sprockets 104 and 112. The sprocket wheel 112 is mounted on the inner end of a shaft 116 which is rotatably mounted in bearings 118 and 120 carried at the opposite ends of the tubular trunnion 32. The outer end of the shaft 116 carries a hand wheel 122 by means of which rotational movement in either direction may be applied to the shaft 116. In order to take up slack in the chain 104, an idler sprocket wheel 124 is rotatably carried at the distal end of a bifurcated bracket 126 which is axially adjustable on a supporting plate 128 by means of adjusting screws 130, the plate 128 being removably clamped by clamping screws 132 over an access opening 134 provided in one side wall of the casting 10.

From the above description it will be seen that in order to effect rotational adjustment of the work-supporting table 12, it is merely necessary to turn the hand wheel 122 in one direction or the other whereupon rotary motion will be transmitted to the drive shaft 116 and transmitted through the power train extending through the chain and sprocket mechanism 110 to the worm shaft 66 and worm wheel 64, from whence rotary motion will be translated to the worm gear 60, shaft 44 and table 12. The power train just described is of a self-locking nature in that the pitch of the worm thread on the worm 64 is sufficiently small that an extremely high speed reduction is attained at the translation point of motion from the worm 64 to the worm wheel 60. With the worm 64 in full meshing engagement with the teeth on the worm wheel 60, the torque required to drive the power train which exists between the hand wheel 122 and worm wheel 60 is relatively small. However, any counter-torque which may be applied by the worm wheel 60 to the worm 64 will be insufficient to overcome the sliding frictional resistance which the worm 64 offers to the worm wheel 60 and it is by this phenomena that the power train is self-locking in one direction. It will be understood that the design of the threads provided on the worm 64 and of the teeth provided on the worm wheel 60 is such that when the worm and worm wheel are in full meshing engagement there will be no back lash or lost motion between these two parts. The worm 64 may be brought into such intimate meshing engagement with the worm wheel 60 by means of the rotatable sleeve 74. As best seen in FIG. 4, the longitudinal axis of the worm shaft 66 is offset radially from the axis of turning movement of the sleeve 74 with the displacement being effected in a direction which is also generally radially of the casting 10 as a whole. Thus, when an adjustment is to be made to bring the axis of the worm shaft 66 closer to the axis of the worm wheel 60, as, for example, when it is desired to take up for any wear which may occur, a relatively large circumferential movement or rotation of the sleeve 74 which may be manually effected on the sleeve in order to move the worm 64 toward the worm wheel 60 will result in an extremely small axial displacement of the worm inasmuch as the axial displacement thereof is a function of the cosine of the angle involved, the cosine being a very small increment as the angle increases from zero magnitude. Thus, there will be no applicable misalignment of the two mating gears for any normal adjustment of the parts. A required adjustment may be made at any time simply by removing the cover plate 92 and loosening the clamping bolts 86 after which the necessary rotational movement may be imparted to the sleeve 74 manually. When the desired adjustment has been effected, the clamping bolts 86 may again be tightened and the cover plate 92 replaced. The above-described adjusting mechanism constitutes an effective cam means for varying the distance between the axis of rotation of the worm 64 and the axis of rotation of the worm wheel 60.

In the form of the invention shown in FIGS. 6, 7 and 8, the details of the center casting of FIGS. 1 and 2 remain substantially the same except for the slight modification thereof necessary to accommodate a direct drive of the worm shaft 66a from a reversible electric motor M and a gear reduction device 200a operatively connected to the motor M. These two instrumentalities have been substituted for the hand wheel 122, the drive shaft 116 and the power train including the chain and sprocket mechanism 110. To avoid needless repetition of description, similar reference numerals embodying the suffix "a" have been applied to the parts in FIG. 6 which correspond to similar or identical parts in FIG. 2.

Elimination of the chain and sprocket mechanism 110 obviates the necessity of employing the remote drive shaft 116 of FIG. 2 and thus the trunnion 32a is made solid and its inner end is fixedly received in the casting 10a. The worm shaft 66a is journalled as in the other form of the invention in bearings 68a and the end thereof remote from the worm 64a is operatively connected to the output shaft 116a of the gear reduction device 200a. The gear reduction device 200a may be of any suitable type, the illustrated form of device including a worm wheel 202a mounted on the shaft 116a and a worm 204a carried on the input shaft 206a of the gear reduction device. The shaft 206a is operatively driven by the motor M.

The gear reduction device 200a and motor M are fixedly connected together and are adapted to be adjustably swung bodily as a unit about the axis of the sleeve member 74a in one direction or the other in order to effect rotational adjustment of the sleeve member and thus cause the work shaft 66a, which is eccentrically mounted within the sleeve, to move toward or away from the periphery of the worm wheel 60a. Accordingly, the gear reduction device 200a is provided with a casing 208a having a continuous lateral bolting flange 210a adapted to be secured to the rim portion of the casing boss 76a by means of clamping bolts 88a which extend through arcuate slots 211a provided in the flange 210a. The clamping bolts 88a also project through similar arcuate slots 82a provided in the annular flange 78a formed on the sleeve 74a. The sleeve 74a is fixedly secured to the flange 210a by means of clamping bolts 89a which are adapted to remain permanently tightened. Thus, the sleeve 74a, gear reduction device 200a and motor M are movable bodily as a unit so that when it is desired to effect an adjustment of the rotational position of the sleeve 74a to take up for wear between the worm 64a and worm wheel 60a, as previously described in connection with the worm 64 and worm wheel 60, it is merely necessary to loosen the clamping screws 88a, while leaving the clamping screws 89a tightened, and then swing the motor M and gear reduction device 200a bodily as a unit to effect the necessary movement of the worm 64a toward the periphery of the worm wheel 60a.

From the foregoing description, it is thought that the nature and many advantages of the herein described driving mechanism for work-positioning tables will be fully understood. The invention is not to be limited to the exact arrangement of parts shown in the accompanying drawings or described in this specification, since various changes in the details of construction may be resorted to without departing from the spirit of the invention. For example, while the driving mechanism for tilting the casting 10 in a fore and aft direction and the driving mechanism for rotating the work-supporting table have been shown as being operable under the control of respective hand wheels 58 and 122, respectively, it will be understood that where large size equipment is concerned, the power trains involved may be motor driven if desired, in which case suitable electric motors will be operatively mounted on the yoke support 14 and casting 10, respectively. Only insofar as the invention has been particularly pointed out in the accompanying claims is the same to be limited.

Having thus described the invention what I claim as new and desire to secure by Letters Patent is:

1. In a work positioner of the character described, in combination, a supporting framework including a pair of horizontally aligned trunnion supports, a hollow casing providing an internal chamber and having trunnions thereon mounted in said supports whereby the casing is mounted for tilting movements in a fore and aft direction about the horizontal axis of the trunnions, a driven shaft rotatably mounted in said casing and extending across said chamber, a work supporting table fixedly mounted on an end of said driven shaft exteriorly of the chamber, a worm wheel mounted on said driven shaft within said chamber, a drive shaft projecting into said casing and having its inner end disposed within the chamber, a boss formed on said casing internally thereof, a sleeve rotatably mounted within said boss, a worm shaft rotatably mounted within said sleeve and having its axis offset radially from the axis of the sleeve, a gear reduction device including a casing, an input shaft and an output shaft, a reversible electric motor including a motor casing fixedly secured to the gear reduction device casing, and a motor shaft, means connecting said motor shaft and input shaft in driving relationship, means connecting the output shaft and worm shaft in driving relationship, means rotatably mounting said gear reduction device casing for limited turning movement on said hollow casing, means for clamping said gear reduction device casing in any desired position of adjustment on the hollow casing, and means fixedly securing said gear reduction device casing to said sleeve.

2. In a work positioner of the character described, the combination set forth in claim 1 wherein said clamping means for the gear reduction device casing includes a flange on said gear reduction device casing having a series of arcuate slots formed therein, and a clamping bolt extending through each slot and threadedly received in said hollow casing.

References Cited in the file of this patent

UNITED STATES PATENTS

| | | |
|---|---|---|
| 1,090,739 | McDonnell | Mar. 17, 1914 |
| 1,402,881 | Murchie | Jan. 10, 1922 |
| 1,463,882 | Fuller | Aug. 7, 1923 |
| 2,059,753 | Scott et al. | Nov. 3, 1936 |
| 2,068,679 | Hokansson | Jan. 26, 1937 |
| 2,348,062 | Faber | May 2, 1944 |
| 2,444,734 | Gillett | July 6, 1948 |
| 2,445,016 | Bentley | July 13, 1948 |
| 2,477,169 | Brekelbaum | July 26, 1949 |
| 2,884,242 | Fleming | Apr. 28, 1959 |